(12) United States Patent
Yamashita

(10) Patent No.: US 9,988,212 B2
(45) Date of Patent: Jun. 5, 2018

(54) METHOD OF ORDER FULFILLING BY PREPARING STORAGE UNITS AT A PICKING STATION

(71) Applicant: Dematic GMBH, Heusenstamm (DE)

(72) Inventor: Shin Yamashita, Oberursel (DE)

(*) Notice: Subject to any disclaimer, the term of this patent is extended or adjusted under 35 U.S.C. 154(b) by 72 days.

(21) Appl. No.: 14/996,965

(22) Filed: Jan. 15, 2016

(65) Prior Publication Data

US 2016/0130086 A1 May 12, 2016

Related U.S. Application Data

(63) Continuation of application No. PCT/EP2014/063930, filed on Jul. 1, 2014.

(30) Foreign Application Priority Data

Jul. 17, 2013 (EP) .................................... 13176798

(51) Int. Cl.
*B65G 1/06* (2006.01)
*B65G 1/137* (2006.01)

(52) U.S. Cl.
CPC ............. *B65G 1/1373* (2013.01); *B65G 1/06* (2013.01); *B65G 1/1378* (2013.01)

(58) Field of Classification Search
CPC ....... B65G 1/06; B65G 1/1373; B65G 1/1378
See application file for complete search history.

(56) References Cited

U.S. PATENT DOCUMENTS

| 6,321,138 B1 | 11/2001 | Livesay et al. |
| 7,261,509 B2* | 8/2007 | Freudelsperger .... B65G 1/1378 414/269 |
| 7,331,471 B1 | 2/2008 | Shakes et al. |
| 2009/0028675 A1* | 1/2009 | Tsujimoto ............ B65G 1/0407 414/273 |
| 2011/0008137 A1* | 1/2011 | Yamashita ........... B65G 1/0492 414/267 |
| 2011/0295413 A1 | 12/2011 | Hara et al. |

FOREIGN PATENT DOCUMENTS

| CN | 1817757 A | 8/2006 |
| CN | 101641270 A | 2/2010 |
| CN | 102101569 A | 6/2011 |

(Continued)

OTHER PUBLICATIONS

International Search Report for PCT/EP2014/063930, dated Sep. 17, 2014.

(Continued)

*Primary Examiner* — Anna M Momper
*Assistant Examiner* — Ashley K Romano

(57) ABSTRACT

A method of order fulfilling by making order and/or product units available from a storage facility in a desired sequence at a picking station is provided herein. The storage facility may include a plurality of multilevel storage racks in which order and/or product units are stored, an automatic storage and retrieval device, such as a shuttle, which retrieves and stores orders and/or product units, and lifts used to transfer the order and/or product units to at least one storage-exit conveyor, wherein each lift is directly connected to a picking station in a picking level by the storage-entry conveyor and the storage-exit conveyor.

17 Claims, 9 Drawing Sheets

(56) References Cited

FOREIGN PATENT DOCUMENTS

| | | |
|---|---|---|
| CN | 102633077 A | 8/2012 |
| CN | 103003174 A | 3/2013 |
| DE | 20112328 U1 | 7/2001 |
| DE | 10234150 A1 | 5/2003 |
| DE | 202004012021 U1 | 1/2006 |
| DE | 102006008932 A1 | 8/2007 |
| DE | 102006023477 A1 | 11/2007 |
| DE | 102009032406 A1 | 1/2011 |
| EP | 1486435 A1 | 12/2004 |
| EP | 1767472 A1 | 3/2007 |
| EP | 1964792 A2 | 9/2008 |
| FR | 2967145 A1 | 5/2012 |
| JP | 50-138578 | 5/1975 |
| JP | 2000-264406 | 9/2000 |
| WO | WO2010/026633 | 3/2010 |
| WO | WO 2013/004712 A1 | 1/2013 |
| WO | WO2013/090970 A2 | 6/2013 |
| WO | WO2014/023539 A1 | 2/2014 |

OTHER PUBLICATIONS

Written Opinion for PCT/EP2014/063930, dated Sep. 17, 2014.
International Preliminary Report on Patentability for PCT/EP2014/063930, dated Jun. 29, 2015.
Decision to Grant in corresponding Japanese Patent Application JP 2016-526501 dated Mar. 20, 2018.

* cited by examiner

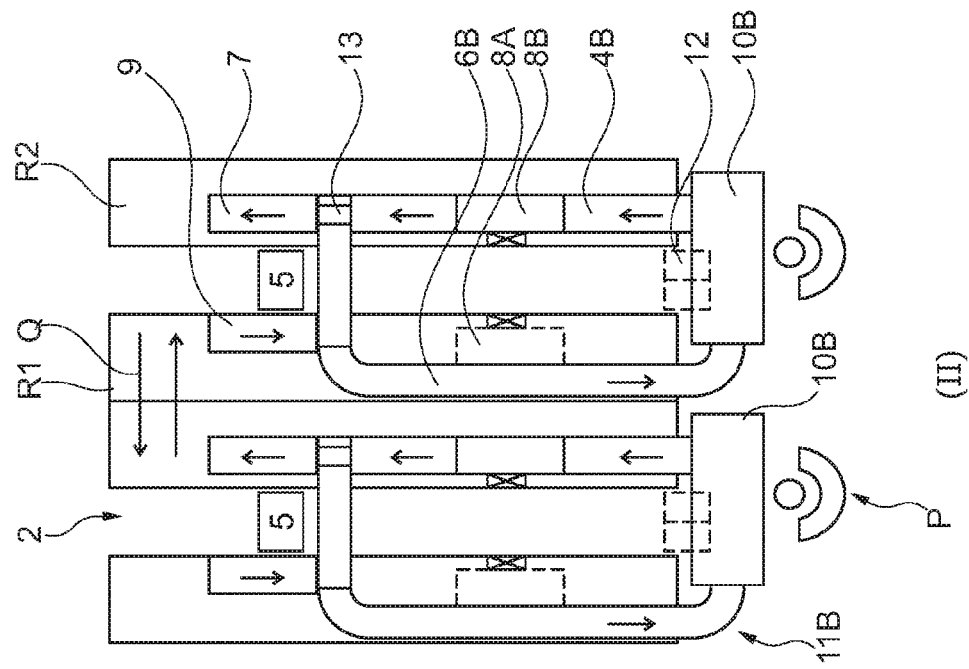
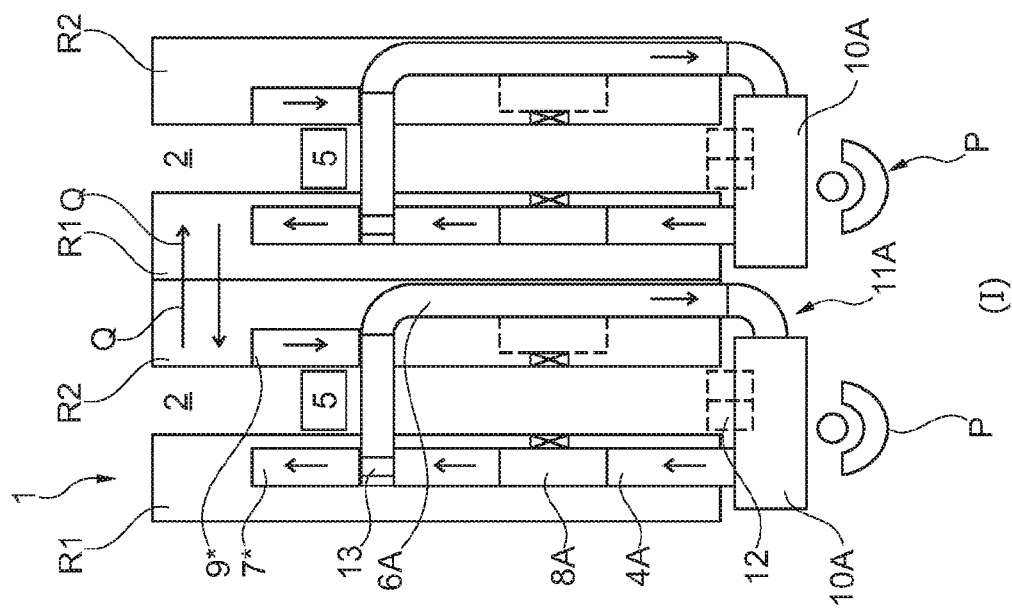
Fig. 3

METHOD OF ORDER FULFILLING BY PREPARING STORAGE UNITS AT A PICKING STATION

CROSS REFERENCE TO RELATED APPLICATIONS

This present patent application is a continuation of International Application No. PCT/EP2014/063930, filed Jul. 1, 2014, by the inventor named in the present application, and claims the benefit under 35 U.S.C. § 119(a) of European Patent Application No. EP 13176798.0 entitled "Method of Order, Fulfilling and Replenishment of Storage Units" filed on Jul. 17, 2013, and both of which patent applications are incorporated by reference herein in their entireties as though fully set forth herein.

TECHNICAL FIELD

Embodiments of this disclosure relate to methods for order fulfilling.

BACKGROUND

When picking or compiling orders from transporting units, such as e.g. articles or containers, it is necessary to provide the transporting or storage units, which are associated with a common order, in a directed or sorted fashion. In addition, it is conventional to intermediately store (buffer) the transporting units of an order, until all of the transporting units required for the order are present. They are then passed together onto a collecting line which leads them e.g. to the palletization area, picking station, goods issue, shipment etc.

In the picking station the goods for fulfilling an order are taken from the transporting or storage units and placed according to the order into an order container etc. The storage container (often called donor) is then routed back into the racking storage and stored until needed for the next order.

A (high bay) racking storage facility includes a storage-entry area, via which the goods are supplied to and from which the Automatic Storage and Retrieval Machine (hereafter called AS/RS) collects the goods for placement in storage, the so-called front-zone. In a similar manner, a retrieval area can be provided, at which after retrieval from storage the AS/RS deposit the goods which are likewise assigned to the front-zone. In the case of automatic picking storage facilities, picking locations are typically situated in the front-zone. In the front-zone, the goods are also identified for the inventory management system or the material flow computer.

EP 1 964 792 B1 by the present applicant discloses a method of making transporting units available from a storage facility on at least one collecting line. AS/RS in each storage racking aisle, retrieval-from-storage and outbound lines are controlled, in such a way as to be matched and coordinated to one another, and are loaded with goods that ultimately they end up on, or are discharged from, the collecting line in a sorted fashion.

The control and matching are thus relatively complex and require evident technical work in the so-called front-zone, i.e., the area outside the actual racking, may be necessary to achieve high trough put and sequencing.

In contrast thereto, one object of the present disclosure is to provide methods and devices for order fulfilling, which may provide sorted retrieval from storage in a simpler manner and without sortation outside of the aisles, and may reduce technical complexity and space, lower cost and achieve better reliability and throughput, as well as address other related and unrelated problems in the art.

SUMMARY

In accordance with embodiments of the present disclosure, each lift can be directly connected to a picking station in a picking level by the storage-entry conveyor and the storage-exit conveyor, and it therefore may be possible to dispense with the so-called front-zone for sequencing while improving performance of the lift, because the aisles are independent from each other and tightly coupled to the picking station.

Preferably, one lift can be connected to one or more picking station, as this simplifies the system and realizes very good throughput. Additionally, two lifts in a single aisle may be connected to one picking station on a single level.

In the present application, the picking stations can be manual operated and either semi- or fully automated order picking stations. A fully automated picking station is defined as a picking station according to the goods-to-person principle with fully automated unit (totes, container, trays, boxes etc.) handling, i.e., a fully automated supply and discharge and presentation of the product and order units. Empty order units and/or units with commissioning goods are automatically supplied to the work station. Units are placed in ergonomically optimal height on the picking station. Usually such a station will also incorporate means for directing, instructing and controlling as well as supervising the picker (e.g., pick-to-light, optical pointing device, IT display etc.), who will still manually pick out of product units into order units. In contrast a semiautomatic picking station will not have the fully automated unit handling just described, but will involve some manual processing of units.

The picking stations may be orientated such that they face each other and lifts are located between them. It is also possible that two picking stations are connected to two lifts on a single level.

Additionally, a picking station may have temporary shelving, e.g., for pre-picking certain articles The automatic storage and retrieval device can be fed by an inbound-buffer-conveyor and/or feeds into an outbound-buffer-conveyor, wherein the buffers are arranged within the racking unit. This allows for high performance due to quick relief of the AS/RS.

The outbound-buffer may feed into the conveyor loop, and the inbound-buffer may be fed by the conveyor loop, for example in the picking level.

The conveyor loop may also contain a junction or switch as an option to selectively feed the inbound-buffer, so that storage units coming from the picking station via the storage-entry feeding line passing through the lift can be conveyed to the inbound-buffer, or, in other words, pass through the loop.

In one embodiment, the at least one lift is arranged in one of the pair of racking units (racks of an aisle) and is possibly of the drive-through-type, but not limited to, and is fed by the storage-entry feeding line and itself feeds the outbound line of a first conveyor loop in a first picking level, but circumnavigates around a second lift arranged in the other of the pair of racking units, which is also of the drive-through-type, but not limited to, and is fed by the storage-entry feeding line and itself feeds the outbound line of a second conveyor loop in a second picking level, wherein the conveyor loop circumnavigates around the first lift in the second picking level. This allows for use of two picking levels that each are only coupled to one lift to achieve high performance.

In the non-picking levels, the lift may be fed by an inbound-buffer and feeds into an outbound-buffer, wherein the buffers are arranged within the racking unit.

In accordance with a further aspect of this disclosure, when transporting or storage units are exchanged directly between two adjoining storage racking units from one storage racking aisle to an adjacent storage racking aisle via cross conveyance locations in the storage racking units, distribution and/or complex sorting in the front-zone can be omitted, since the transporting units are already stored in a single storage rack aisle even if initially they were stored elsewhere. When retrieved from storage, they are simply retrieved in sequence within a single aisle. Therefore, a direct transfer of the transporting units without distribution or sorting outside of the aisles can be achieved without "crossing" conveyors and this with a simpler and smaller technical installation with smaller space and higher reliability. The transporting or storage units can therefore be retrieved from the respective aisle in the required sequence.

The storage can include a fully automated storage.

For example, storage racking locations of abutting racking units are used for passing transporting or storage units from one side of the racking through to the next, so that the transporting units can be transferred from one racking to the next.

Therefore, cross conveyance or sorting is possible inside the racking units themselves and accordingly it is possible to dispense with or at least minimize "cross conveyance" in the front-zone.

In an expedient manner, the cross conveyance locations are provided in each level or any selected level of the storage racking units.

Particularly, effective path-time optimization is achieved if the cross conveyance locations are disposed closer to inbound and outbound buffer conveyors. It is also possible to locate cross conveyance locations at different positions within a level.

The cross conveyance locations can also be used as buffers, especially if they belong to final destination aisle of the transport or storage units, i.e., the transporting or storage units remain therein, until they are actually needed or retrieved.

The exchange can be effected actively or passively with regard to the AS/RS i.e., on the one hand the cross conveyance location can be simply a passive storage surface, on which the AS/RS of one aisle deposits transporting or storage units (quasi places them into storage) and from which the AS/RS of the adjacent aisle receives transporting units (quasi removes them from storage). For each racking storage location or cross conveyance location, this procedure can be performed in one direction or in both directions.

On the other hand, it is likewise possible to equip the cross conveyance location with corresponding conveyance technology, such as driven rollers, gravity flow track, idler roller, conveyor belts with or without a drive etc. The AS/RS can then deposit the transporting or storage units and the conveyance technology of the cross conveyance location performs transportation. The cross conveyance locations can also be equipped with a push mechanism for the transporting units.

By reason of the simplicity of the cross conveyance locations, it is also possible to subsequently retrofit or refit cross conveyance locations and to adapt flexibly to the level of efficiency required in the storage system.

The cross conveyance locations can thus optionally be configured for bidirectional or unidirectional exchange and/or for active or passive exchange.

For exchange purposes, the AS/RS can likewise place the transporting units in normal storage, double-depth storage or multiple-depth storage in the cross conveyance location. The AS/RS of one aisle can thus place the transporting or storage units in storage in the cross conveyance locations to such a depth that they are already to be assigned to the adjacent racking and can be reached "normally" by the AS/RS in the adjacent racking.

In addition, the load receiving means, e.g., telescopic arms, can have an extended range.

It is also possible to use a stacked storage of transporting or storage units.

Since the cross conveyance locations are subjected to be utilized extensively and reduce a damage of transport or storage unit, it is expedient if the floors of the cross conveyance locations can be coated to reduce friction and/or structural reinforcement can be effected.

In addition, the AS/RS may include single-level racking serving units, such as, for example, shuttles or satellite vehicles. Also, shuttles with a stacked arrangement of two load handling platforms or an elevating platform can be used for handling several levels from a single rail.

It is thus possible to achieve a particularly high level of retrieval efficiency whilst fully maintaining the desired sequence of transporting or storage units in any aisle. This is also achieved with considerably less technical work than in accordance with known techniques.

In one option, the shuttle is decoupled from the at least one lift by an inbound-buffer-conveyor and/or an outbound-buffer-conveyor, wherein the buffer-conveyors are arranged within the racks.

The outbound-buffer-conveyors and inbound-buffer-conveyors may also be located in a rack or alternatively outside of a rack. Alternatively, the outbound-buffers are located in or outside of one rack of an aisle and inbound-buffers are located in or outside the other rack of an aisle. Further, it is possible to locate the outbound-buffers and/or inbound-buffers in or outside of the racks of an aisle in a per level alternating fashion, i.e., the inbound-buffers are arranged on even levels of a rack and outbound-buffers in the odd levels of the same rack. Under this scenario, the units on a level where the outbound buffer conveyor is missing are always transferred to an adjacent aisle via cross conveyance locations. Likewise, on the level where the inbound buffer conveyor is missing units from an adjacent aisle are received via cross conveyance locations. It is also possible to not locate buffer conveyors on each and every non-picking level but rather on every few levels.

For increased performance, the outbound-buffer-conveyors and inbound-buffer-conveyors may be located on every non-picking level.

The storage-entry conveyor and the storage-exit conveyor should preferably be arranged in the same level, especially the picking level, i.e., the level in which the picking station is located. Alternatively, the storage-entry conveyor and the storage-exit conveyor may be arranged in different levels, so that the picking station is supplied on one level and units are dispatched from it on a second level.

It is also possible that each storage-entry and/or exit conveyor level has buffer conveyors directly feeding or fed by storage-entry and/or exit conveyors.

It should be understood that where the term "transporting units" or likewise "storage units" is used, it is not to be interpreted as limiting, in fact other types of transport (e.g.

trays, pallets etc.) can also be used equally effectively within the scope of the invention. In particular, the term "transporting units" or "storage units" also includes totes, trays, containers, paperboard containers, carton boxes, packaging units, i.e., combined individual articles, etc., and individual articles. These units can either be donor units, from which a picker takes articles for an order, so that these function as a donor (often also called product units), or these units can be order units for collecting articles of an order.

The transporting or storage units can be placed in storage randomly ("chaotically") being distributed over the entire system without knowledge of the subsequent sequence when they are retrieved. In contrast to DE 299 12 230 U1, no restriction as to possible modules or storage areas may be needed or required.

According to embodiments of this disclosure, so-called Multishuttles®, as manufactured by Dematic Systems GMBH, are used as the single-level AS/RS. For example, the Multishuttle® is a system which can be used universally, and is constructed in a modular fashion and combines storage and transportation in an integrated concept. The Multishuttle® supplements the domain of automatic small parts storage facilities as a high-performance, inexpensive and innovative solution. It is a rail-borne vehicle which operates in the racking and serves the entire storage system. The system concept is based upon autonomous rail-guided vehicles for container transportation which operate inside and outside the storage system. A specific load receiving means permits short load-change times and simultaneous loading and unloading. The system has travel rails which are installed in each level of the storage facility or elevated or suspended in the pre-zone. In addition to guiding the vehicles, they also supply voltage thereto.

The shuttles can be used in two arrangements, a so called "captive" or "roaming" arrangement. In the captive arrangement, the shuttles may stay in their respective level. In the roaming alternative, the shuttles can change levels as required.

Possible outbound lifts include in particular vertical conveying means, and each outbound lift can have one or more, for example two, locations/positions for the transporting or storage units.

Also, each level of the storage racking can have at least one buffer location for decoupling the single-level AS/RS and the outbound lift. This renders it possible to fully utilize the quicker single-level AS/RS and to prevent empty-running of the lift.

Each outbound lift may be connected to several outbound lines. This improves the sorting options and increases the number of orders which can be processed in parallel, or the number of stations which can be supplied.

In one example, the outbound lines are formed as accumulations conveyers. These may include a mechanical device for accumulation, e.g., a movable stop element.

Each outbound lift may include a separately driven conveying means for each location. For example, each outbound lift has two locations which are each provided with a separately driven conveying means movable in different directions. Therefore, the transfer of two transporting or storage units for each level (e.g., in a previously standing arrangement) can be effected simultaneously in different directions or onto different outbound buffers, e.g. to the left and right. In addition, the reception of the transporting units onto the lift may be controlled so that the two transporting/storage units are to be discharged onto one level. This is possible on account of the high efficiency of the shuttles used, since the transfer locations (buffer location) to the outbound lift are practically always occupied, so that for the control of the outbound lift there is provided a selection option which allows the lift to be occupied accordingly by transporting/storage units for different outbound buffers of one level.

The system can further be characterized by a high degree of flexibility, since the inbound and outbound feeding lines can be connected to the corresponding lifts at any points.

In parallel with the outbound lifts, it is likewise possible to provide dedicated inbound lifts with correspondingly supplying distribution feeding lines. On the other hand, it is also possible to control the outbound lifts such that, in addition to the outbound operation, they can also be used as inbound lifts. In the reverse scenario, optionally, dedicated inbound lifts can also be used as outbound lifts according to requirement. In the event of malfunctions of individual lifts, this also permits uninterrupted operation or an increase in system efficiency. To this end, the inbound or outbound lines may be disposed between the lift and racking at different heights, and two similar combined inbound and outbound levels may be provided, the collecting lines of which are brought together after passing the last outbound line in sequence.

The transverse displacement function by means of the cross conveyance locations within the rack offers the advantage that, in the event of a malfunction of e.g. an outbound lift/inbound lift or feeding lines, the function of the relevant aisle can be maintained.

Further features and details of the invention are apparent from the following description taken in conjunction with the accompanying drawings.

BRIEF DESCRIPTION OF THE DRAWINGS

The accompanying drawings, which are included to provide a further understanding of the embodiments of the present disclosure, are incorporated in and constitute a part of this specification, illustrate embodiments of the invention, and together with the detailed description, serve to explain the principles of the embodiments discussed herein. No attempt is made to show structural details of this disclosure in more detail than may be necessary for a fundamental understanding of the exemplary embodiments discussed herein and the various ways in which they may be practiced.

FIG. 3 shows a schematic plan view of a first and second picking level in storage facility according to a further embodiment;

DETAILED DESCRIPTION

Figure 2:
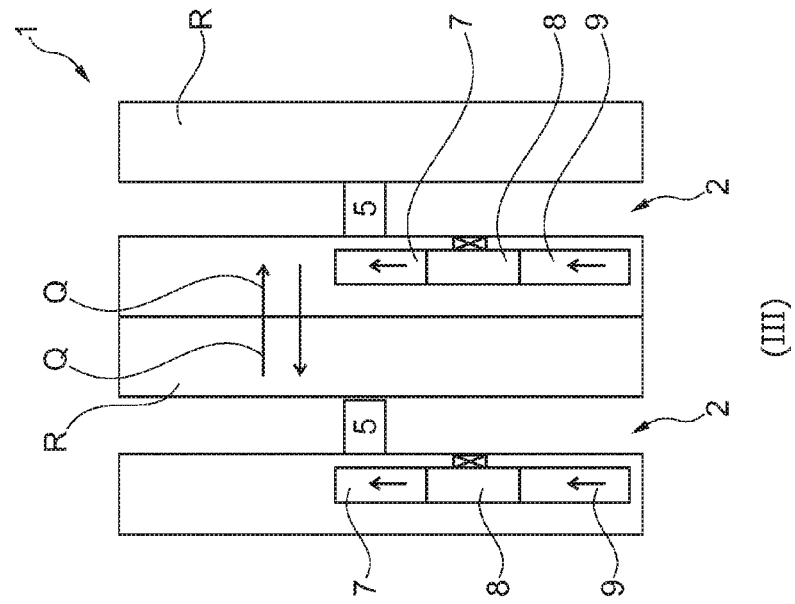
FIG. 2 shows a schematic plan view of other levels in the storage facility of FIG. 1.
Figure 1:
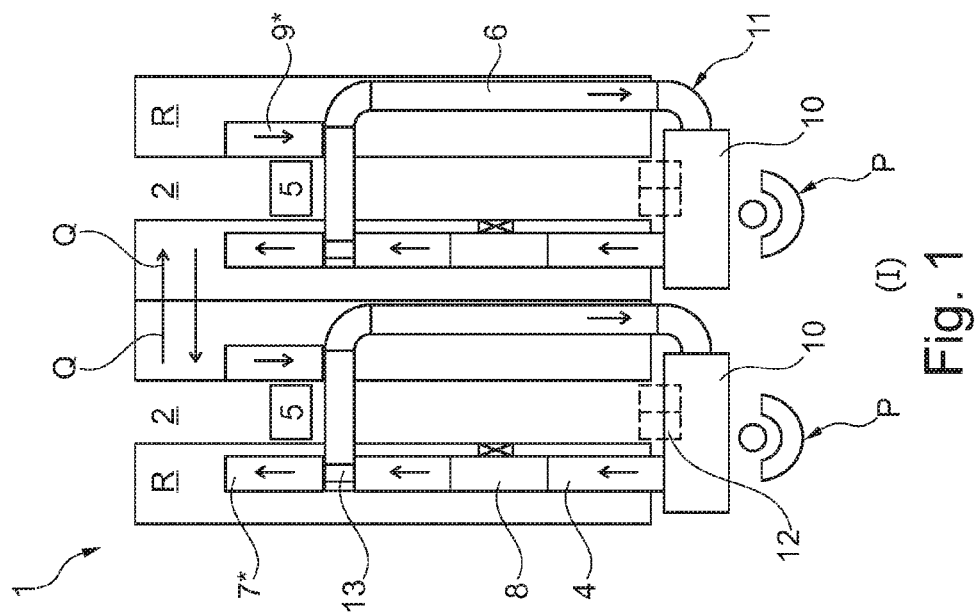
FIG. 1 shows a schematic plan view of a picking level in a storage facility according to one embodiment.

FIGS. 1 and 2 illustrate a storage facility, which is designated as a whole by the reference numeral 1, having a plurality of storage racking aisles 2 and storage racking units R with a plurality of levels 3.

The storage racking units R are disposed in such a manner that the storage racking units R which are not disposed on the outside are each disposed in pairs adjoining one another and have a storage racking aisle 2 on one side. The storage racking units R located on the inside in each case abut one another "back-to-back."

Every other storage racking aisle 2 is provided with a lift 8 having at least one or more locations/positions for units T in each case. The lift 8 is adjoined by an inbound line 4 and a removal-from-storage feeding line or outbound conveyor 6 or can be configured vice versa. Corresponding inbound and outbound buffer conveyors 7* and 9*, provided as an option, are disposed between the lift 8 and the storage racking R in the picking level I, in order to decouple the lift 8 from the single level AS/RS 5 (also referred to as shuttles) which travel in the storage racking aisle 2.

Lift 8 is of the drive through type, meaning that a storage unit T may either use the lift to change levels or pass through the lift 8, in a conveyor manner, so that it may be conveyed via conveyor 6 and RAT 13 to inbound-buffer 7 on the storage level or from the lift 8 conveyed via conveyor 6 to the picking station 10.

The lift 8 is arranged in one of the pair of racking units R and is fed by the storage-entry feeding line 4 and itself feeds the outbound line 6 in the picking level I.

The shuttle 5 is fed by an inbound-buffer 7 and feeds into an outbound-buffer 9, wherein both buffers 7, 9 are arranged within the racking unit R directly behind the conveyor loop 11.

The outbound-buffer 9 feeds into the conveyor loop 11 or outbound line 6 and inbound-buffer 7 is fed by the conveyor loop or outbound line 6 after the lift 8.

For this reason, the conveyor loop 11 or outbound line 6 may contain a junction or switch 13 to selectively feed the inbound-buffer 7.

Therefore, each aisle 2 in the picking level I is connected to a picking station 10 by a conveyor loop 11 formed with the storage-entry feeding line 4, the lift 8 and the outbound line 6, to which storage units T are fed for picking for fulfilling orders by the picker P.

Picking station 10 may include temporary shelves 12 as a temporary store for pre-picking often used articles.

The shuttles 5 are provided in each storage racking aisle 2 and in each level III. These are thus a so-called "captive" variant, in which the shuttles or satellite vehicles 5 are fixedly allocated to a level 3 and do not change levels or aisles, which theoretically would be possible.

The shuttles 5 include a transport platform for receiving/carrying the respective storage unit T (paperboard container, tray, totes, container, goods without any loading aids, etc.). Disposed in each case to the side on the transport platform are telescopic arms which push the storage unit T off, or pull it onto, the platform. In addition, the telescopic arms are extendible on both sides of the storage racking aisle 2 into the racking units R and have fingers which can open and close in a known manner.

Particular exchange locations Q for cross-conveyance of storage units T from one racking R into the adjacent racking R are provided in each level 3 of the storage racking units R, so that the storage units T are exchanged inside the storage racking units R themselves and it is possible to dispense with or at least minimize corresponding work in the pre-zone. The locations Q for cross-conveyance of storage units T are located directly behind the buffers 7, 9 in the racking units R. However, they may also be located at different positions within the racks.

Therefore, the shuttle 5 or the telescopic arms thereof can deposit storage units T in the cross conveyance locations Q and push them to the corresponding location in the adjacent racking R. For this purpose, the respective storage unit T is being acted upon by the finger of the telescopic arms beyond a rear storage location of one cross conveyance location Q of the first racking R into the respective rear storage location of the adjacent cross conveyance location Q of the adjacent racking R.

A plurality of cross conveyance locations Q may be arranged so that they do not have to be emptied immediately so operation of neighboring shuttles on the same level and can be decoupled. In addition, extra cross conveyance locations, depending upon the compilation of the order to be retrieved can be used as a buffer store, from which articles are retrieved from the location directly.

For the purpose of retrieval in other non-picking levels III, the storage units T are taken from the storage racking R by the shuttle 5 and are discharged onto the retrieval or outbound buffer 9 which conveys the storage units T further to the lift 8 and thus to the outbound feeding line 6, i.e. loop 11 in the picking level I. In the reverse scenario, placement into storage in the respective storage racking R is effected by the inbound lines 4, the lift 8 and the storage buffer 7 and the shuttle 5. If necessary, the normal operation direction may be reversed, such that conveyor 6 is used for storage and conveyor 4 is used for feeding the picking station 10.

In a usual picking process for order fulfillment, the picker P takes the goods out of the storage unit T conveyed from the loop 11 or line 6 out of the storage 1 to picking station 10 and puts them into provided order carrier like cartons or totes.

After processing, the storage unit T is transported back into the storage system 1 via inbound line 4.

Figure 4:
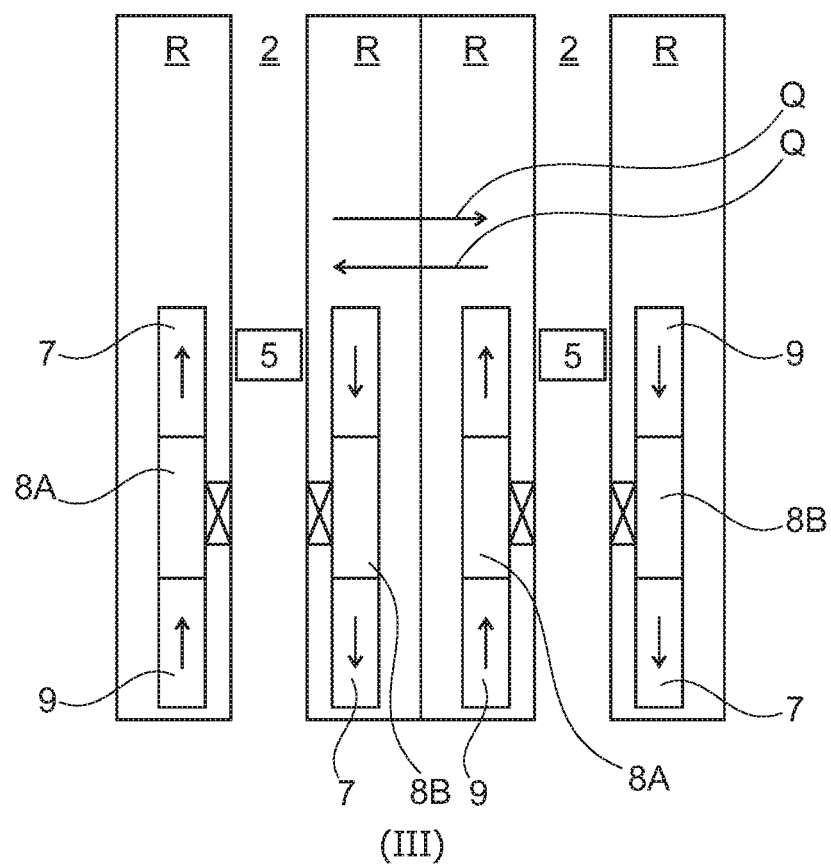
FIG. 4 shows a schematic plan view of other levels in the storage facility of FIG. 3.

FIGS. 3 and 4 illustrate a second storage facility 1, which is similar to the one described above and is therefore designated with like reference numerals and only substantial differences will be discussed below.

In contrast to storage facility 1 above, this storage facility has two picking levels I and II arranged on top of each other. Their structure is similar to picking level I described above.

However, a first lift 8A arranged in one of the pair of racking units R1 is fed by the storage-entry feeding line 4A and itself feeds the outbound line 6A of conveyor loop 11A in first picking level I, just as in facility 1 above, but circumnavigates around a second lift 8B arranged in the other of the pair of racking units R2, which is also of the drive-through-type and is fed by the storage-entry feeding line 4B and itself feeds the outbound line 6B of conveyor loop 11B in a second picking level II, wherein the conveyor loop 11B circumnavigates around the first lift 8A in the second picking level II.

In the non-picking levels III (see FIG. 4) the lifts 8A, 8B are fed by an inbound-buffer 7 and feed into an outbound-buffer 9, as described above.

So, the system basically includes two pick stations 10 located one on top of another in levels I and II and two drive-thru lifts 8A, 8B per aisle 2, wherein each lift 8A, 8B serves one level I, II of pick stations 10 only.

Directly connected to the conveyor loop 11 (or conveyor 6) are two buffer conveyors 7*, 9*. One buffer conveyor 7* transports the units T for storage by shuttle 5, the other one 9* is installed on the opposite side for buffering units T that come from the storage merged into the conveyor loop 11 to be transported to the picking station 10.

Also, there are two optional RATs 13, which are only used/installed if levels I and II are served by shuttles 5 and the buffer conveyors 7*, 9* for diverting units onto/from outbound conveyor 6.

The special design of the conveyor loop 11 is that it is only connected to one lift 8 and one picking station 10.

For example, on the pick level I, the conveyor 6A is routed around either in front or behind of the second lift 8B without any connection to it and connected to picking station 10A. Likewise, on pick level II, the conveyor 6B circumnavigates the first lift 8A and connected to picking station 10B in the same but mirrored manner.

The shuttles 5 have different working ranges within this system. The shuttles 5 on the two picking levels I, II only need to drive to the buffer conveyors 7*, 9* to serve the system with units T allocated to these levels.

The shuttles 5 in the other non-picking (or storage only) levels III have full access to the complete aisle 2 because there is no conveyor loop linking to the picking stations 10. However, there is two pair of buffer conveyors 7, 9 installed serving the lifts in one direction at each side of the aisle and the other direction on the other side of the aisle.

So the shuttle 5 passes the lifts 8 and can either drop units on the one side to the outbound buffer conveyor 9 to supply the lift with goods or on the other side it can pick up units T from the inbound buffer conveyor 7 coming from the lift.

With this design, the picking stations 10 have full accessibility to every non-picking level III, but the levels I, II connecting the picking stations 10 may only have the accessibility to either picking station 10A or 10B located at the same level unless unit T is routed through the pick station to get to another loop.

When a storage unit T stored in the racking R is needed for picking, the shuttle 5 picks it up and transports it to cross conveyance location Q, if the unit is not in the desired aisle 2, from where it is transferred to the adjoining aisle and picked up by shuttle 5. If necessary, this process is repeated, until the unit reaches the destination aisle 2.

In the final aisle 2 the shuttle 5 picks up the unit T and transports it to the outbound buffer conveyor 9.

If the unit T is brought to the buffer conveyor 9 at the picking station level I or II, it waits on the buffer until the time for this unit has come (i.e., the conveyor has a window/free space for the unit according to the required retrieval sequence of the order to be fulfilled) and is then merged into the outbound conveyor 6 of the loop 11 in the right sequence.

If the unit T is brought to the buffer conveyor 9 at another non-pinking level III, it will be picked by the lift 8 then dropped to the outbound conveyor 6 on the picking level I, II and then conveyed within the conveyor loop 11 to the picking stations 10 where it is processed.

After picking is performed at the picking station 10, the unit T is returned back onto the inbound conveyor 4 on which this unit is then returned into the storage racking.

The unit can be elevated to a storage level III or simply pass through the lift 8 if the storage destination is the picking level I, II.

Once the unit is brought to the designated level III, it is dropped to the buffer conveyor 7 connected with the lift 8 serving the desired storage level III. Afterwards, the shuttle 5 in the corresponding aisle 2 of the destination level picks up the storage unit T and stores it into the desired racking location.

The units T on the outbound conveyor 6 on the way to the picking station 10 do not interfere with the other lift because the conveyor 6 or loop 11 is routed around this lift.

Many of the below embodiments have similar or like devices, installations etc. which are therefore indicated by same reference numerals.

However, in the picking levels I and II the shuttles 5 and the buffer conveyors 7, 9 are optional as are also the cross conveyance locations Q.

Also, there are two optional RATs 13, which are only used/installed if levels I and II are served by shuttles 5 and the buffer conveyors 7*, 9* for diverting units onto/from outbound conveyor 6.

Figure 5:
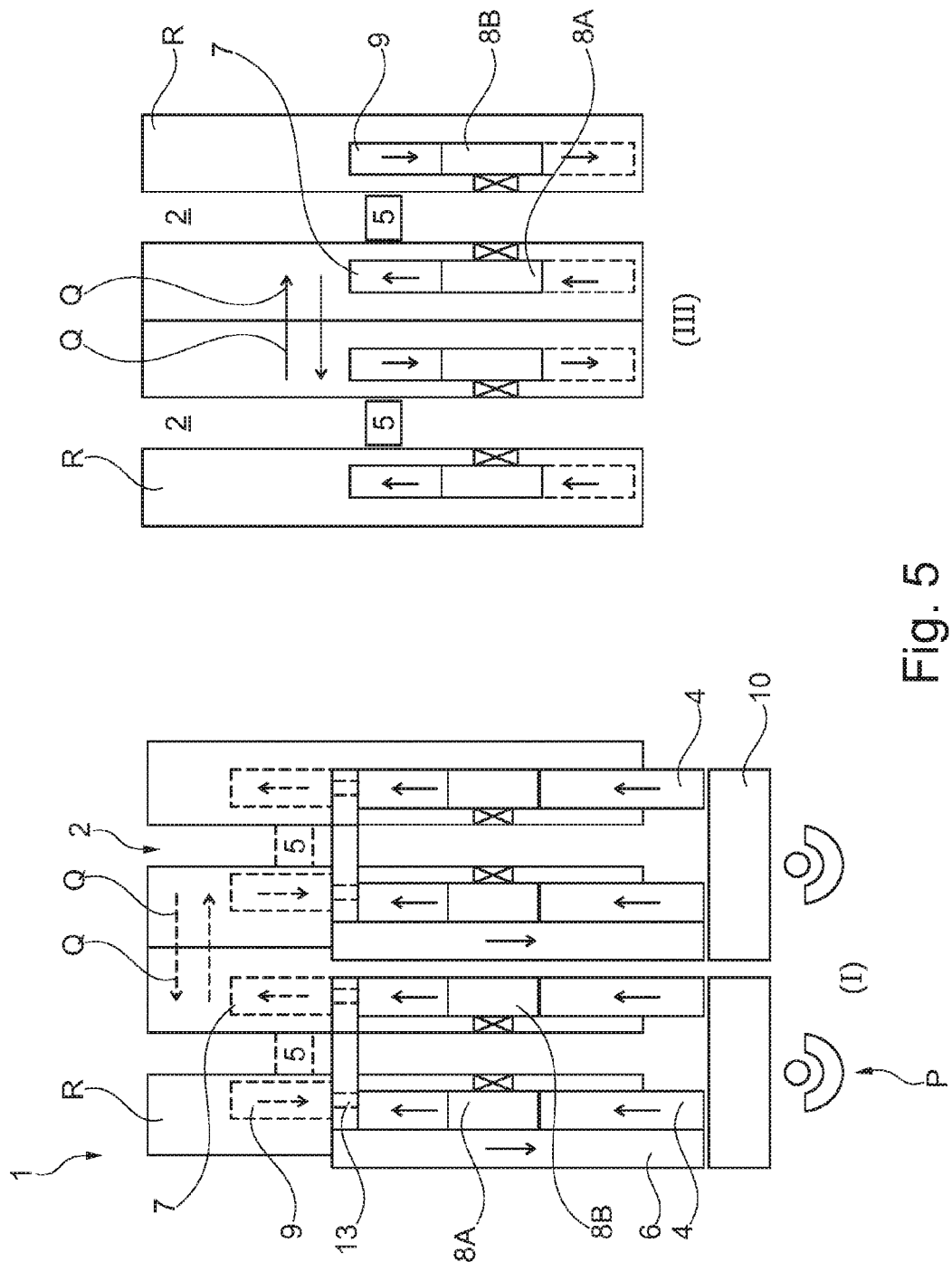
FIG. 5 shows a schematic plan view of a further storage facility similar to FIG. 1 or FIG. 3, wherein picking stations are connected to two lifts within an aisle for consolidated or mixed sourcing and dispatch.

FIG. 5 is similar to the embodiment shown in FIG. 3. Non-picking levels III are the same as in FIG. 4, but second pair of buffer conveyors 7, 9 being optional in a rack R. When no second pair of buffer conveyors are used, the buffer conveyors are alternated in their conveying direction in every or every few levels, i.e., in even levels a rack R has buffer conveyors in a certain direction and in odd level in opposite direction if additional pair of buffer conveyors on each level are not allocated. Such an arrangement realizes the dual cycle lift operation which improves lift performance.

Picking-level I has an inbound conveyors 4 which leads into both lift 8A and 8B, which are of the drive-through kind. The units T are intelligently distributed over two inbound conveyors 4 for optimum operation of lifts 8 and shuttles 5. Lift 8 in turn obviously may allow for a level change of units. To dispatch units from the racking to the picking station 10 etc., units are conveyed from lift 8A and 8B in level I onto outbound conveyor 6, where units T are intelligently merged from two lifts 8 for optimum operation of lifts 8, shuttles 5 and managing sequencing and for which the units are redirected via a RAT 13 onto outbound conveyor 6 and on to the picking station 10. Alternatively, they may pass through RAT 13 onto buffer conveyor 7* in level I. Units to be dispatched from racking in level I are dropped off onto buffer conveyor 9* by shuttle 5 in level I, which is connected to outbound conveyor 6.

Level I also has a second lift 8B in the same level together with conveyors 4, 6 so that the power of two lifting carriages can be utilized with a single picking station level. There may be more than one pick station per aisle and each are then located on top of each other.

As indicated by the hashed lines in level I the buffer conveyors 7*, 9*, shuttles 5 and RAT's 13 as well as cross-conveyance locations Q are optional on this picking level.

Figure 6:
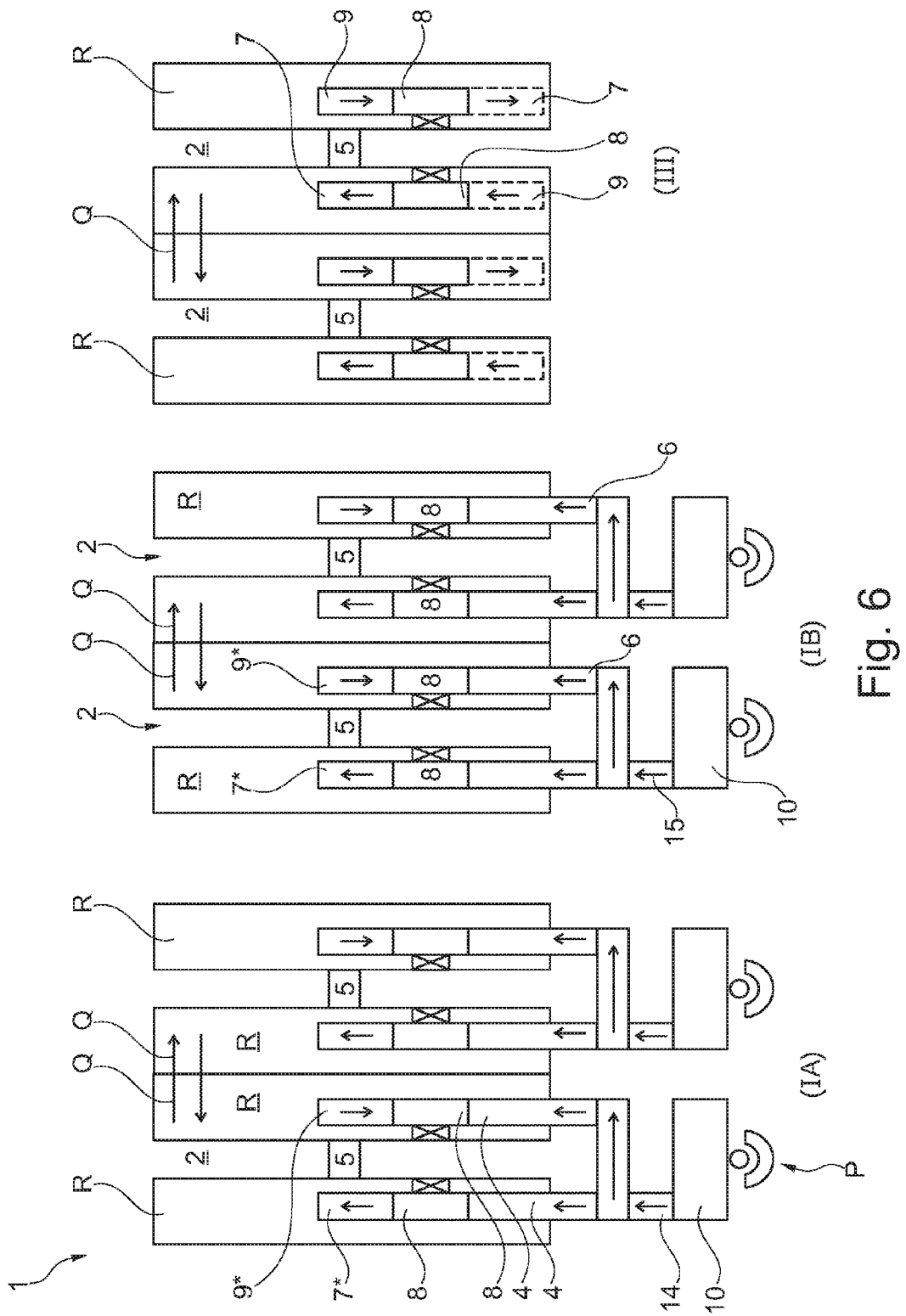
FIG. 6 shows a schematic plan view of a further embodiment of a storage facility, wherein the picking stations are connected to two lifts within an aisle via two levels for consolidated or mixed sourcing and dispatch.

The embodiment shown in FIG. 6 has a pair of inbound and outbound conveyors 4, 6 per aisle alternating by conveyor levels, so that each level I-A has two inbound conveyors 4 and each level I-B has two outbound conveyors 6.

The two inbound conveyors 4 are directly on level I-A and the two outbound conveyors 6 are in a level I-B, which is not a full level below (or above), but beneath level I-A such that they both feed/dispatch from one picking level (same picking station 10).

The picking station is connected to the lift via common connection conveyors 14 where units T are intelligently distributed over two inbound conveyors 4 for optimum operation of lifts 8 and shuttles 5 and the two outbound conveyors 6 are connected where units T are intelligently merged from two lifts for optimum operation of lifts, shuttles and managing sequencing and connected to the corresponding picking station 10 by a common connection conveyor 15.

Non-picking levels III are the same as in FIG. 4, with the second pair of buffer conveyors 7, 9 being optional in a rack R.

Figure 7:
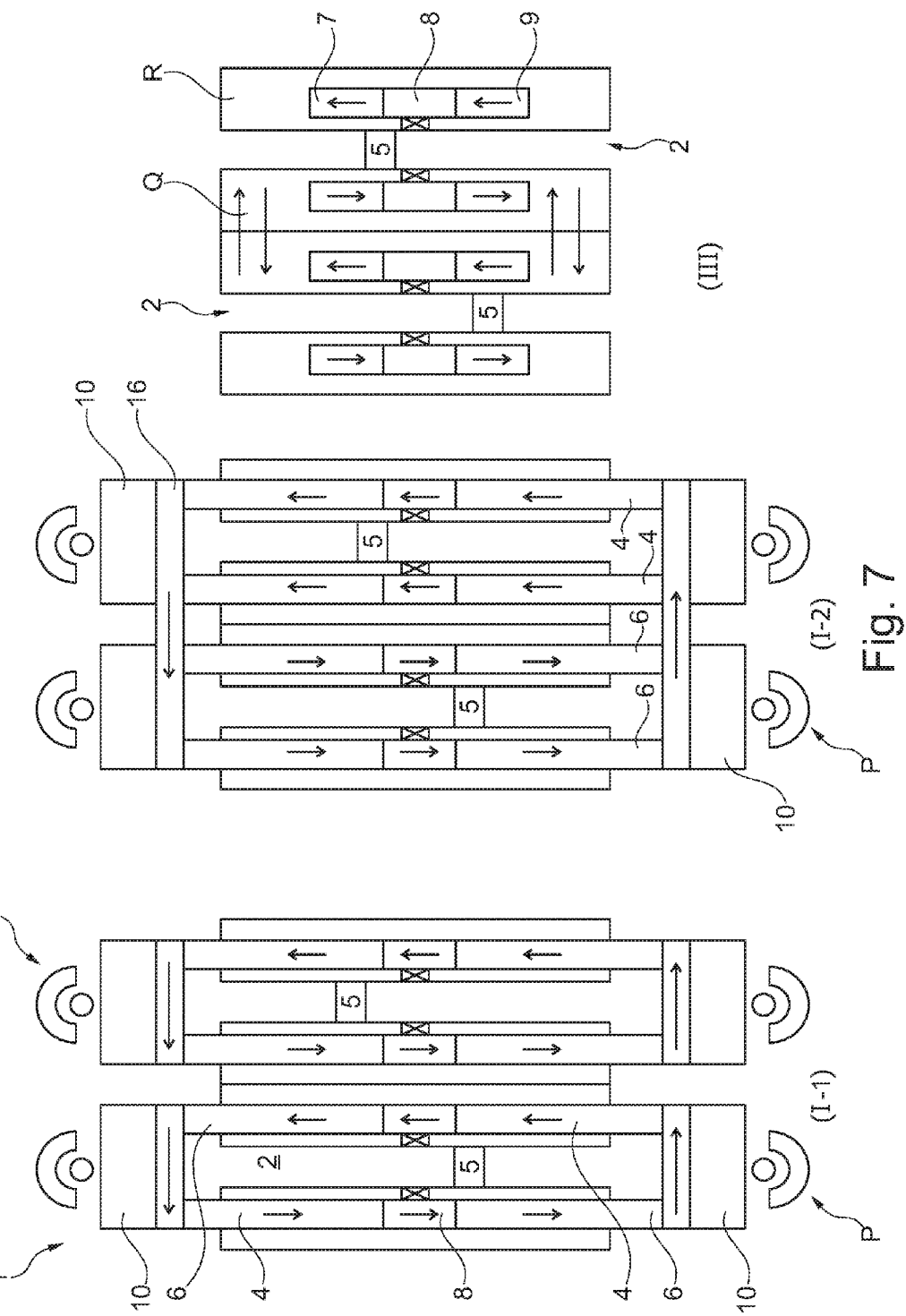
FIG. 7 shows a schematic plan view of a further example embodiment of a storage facility, wherein the picking stations are arranged on top (or below or even in the middle of) the storage racking in such a way that a lift is feeding the pick station and at the same time fed by another pick station located opposite side of the lift and another lift is feeding another station located opposite side of the lift and at the same time fed by the pick station.

As shown in FIG. 7, the picking stations 10 are arranged on top (or below or even in the middle of) the storage racking R and on both sides of an aisle 2. More than one picking level can be used.

So each aisle 2 can be connected to two picking stations 10, one at each end (I-1), or alternatively each two aisles can be connected to two stations 10 at each end, consolidated by conveyors 16 (I-2).

The picking level I is sourced by the lifts 8 and the stations 10 are connected by inbound conveyors 4 and outbound conveyors 6.

The non-picking levels III are the same as above but always have a second of buffer conveyors 7, 9 for embodiment of level I-1 whilst those are still an option for embodiments of level I-2. They may have cross conveyance locations Q to both sides of the lifts 8.

Figure 8:
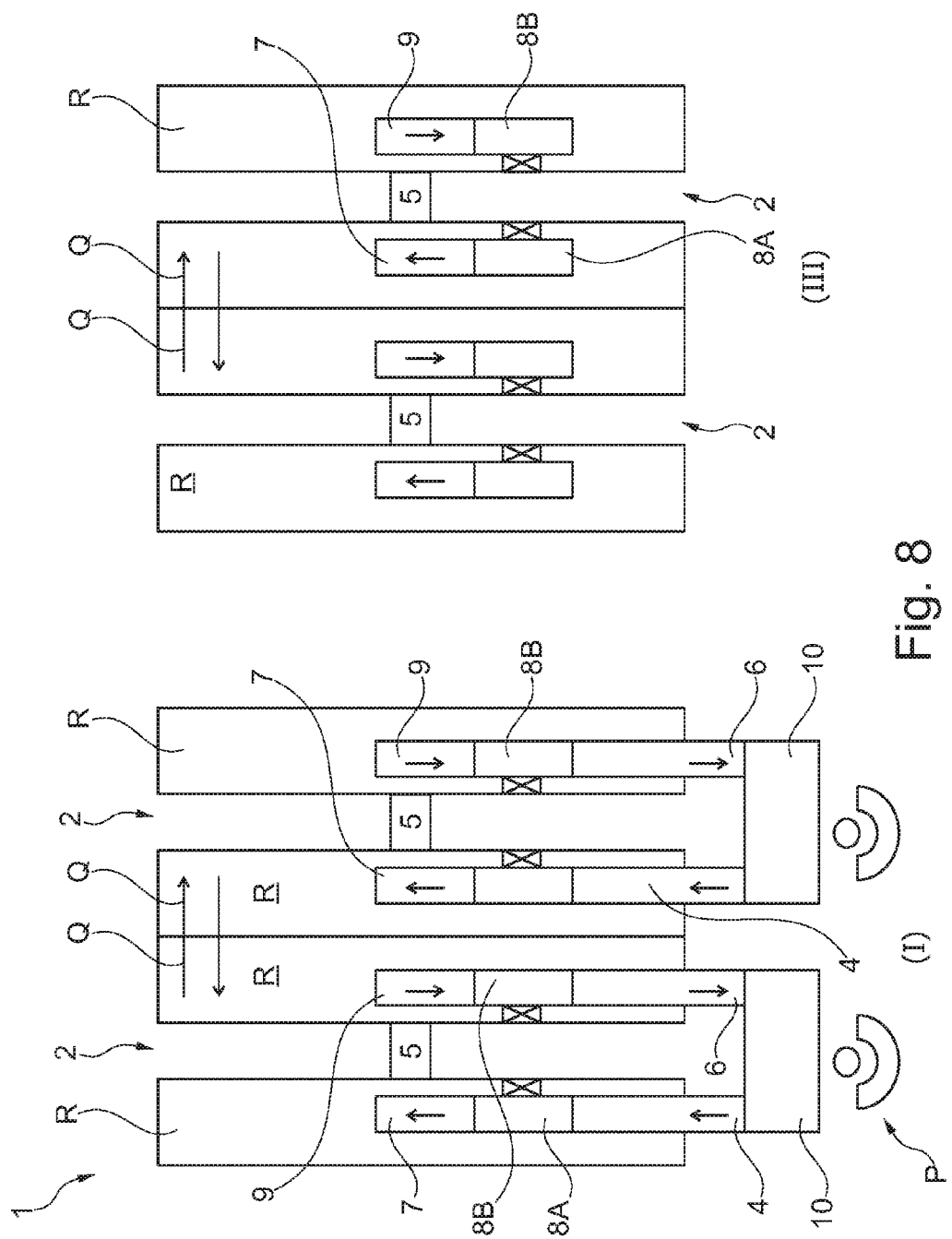
FIG. 8 shows a schematic plan view of a further example of a storage facility.

FIG. 8 illustrates that each aisle 2 of the picking level I can have a pair of lifts 8, one in each rack R, one for inbound 8A and another one for outbound 8B transportation with inbound conveyor 4 feeding it and outbound conveyors 6 receiving from it respectively supplied from/to picking stations 10. More than one picking level may be installed. The other levels III correspond to level III as described above.

With such an arrangement, units stored in any level can be routed to any picking level and vice versa.

Figure 9:
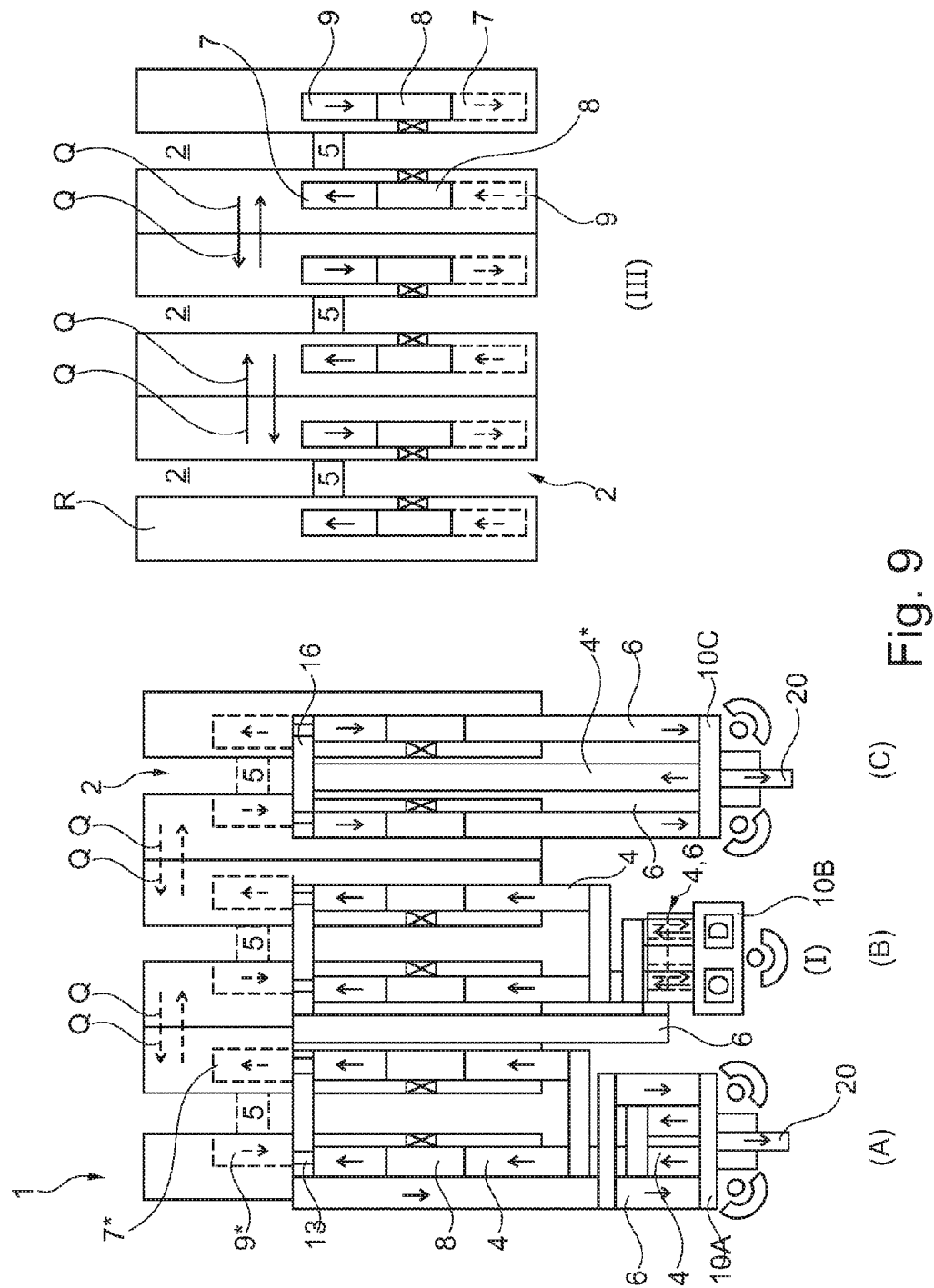
FIG. 9 shows a schematic plan view of storage facility shown in FIG. 5 but with further possibilities to connect picking stations to lifts within a storage facility.

In FIG. 9 three alternative layouts for connecting picking stations 10 to lifts 8 are shown. The non-picking levels III are generally the same as FIG. 5.

The picking levels IA, B are similar to FIG. 5 in that the outbound conveyor 6 circumvents one of the two lifts 8 of this level for sourcing of units to the picking station 10.

In embodiment of level IA, the outbound conveyor is then split up and conveys units to the picking station 10A on two sides, as it is a dual person picking station. Finished order units may then be dispatched via shipping conveyor 20 directly from the picking station 10. Units that are to be returned to storage are dispatched correspondingly on two inbound conveyors 4, arranged flush to or below the outbound conveyor 6 that are merged and then divided again when entering the storage racking.

In an embodiment of level IB, the picking station 10B the outbound conveyor 6 is arranged directly beneath/below (indicated by hashed lines) the inbound conveyors 4 and is split up to conveys units to the picking station 10B from below at two locations, typically one for order units O and one for donor units D but may act as dual person picking station that works similar way to level IA.

Dispatch of the units is allowed by two inbound conveyors 4 that are merged and then divided again when entering the storage racking.

In level IC, the picking station 10C is also a two person operated picking station which is sourced by two outbound conveyors 6 directly connected to lifts and is dispatched by one inbound conveyor 4 between the racks of aisle 2 connected to both lifts 8 via conveyor 16 where unit T is intelligently diverted into two lifts. The station 10C may have a shipping conveyor 20 connection for immediate dispatch of finished units.

Figure 10:
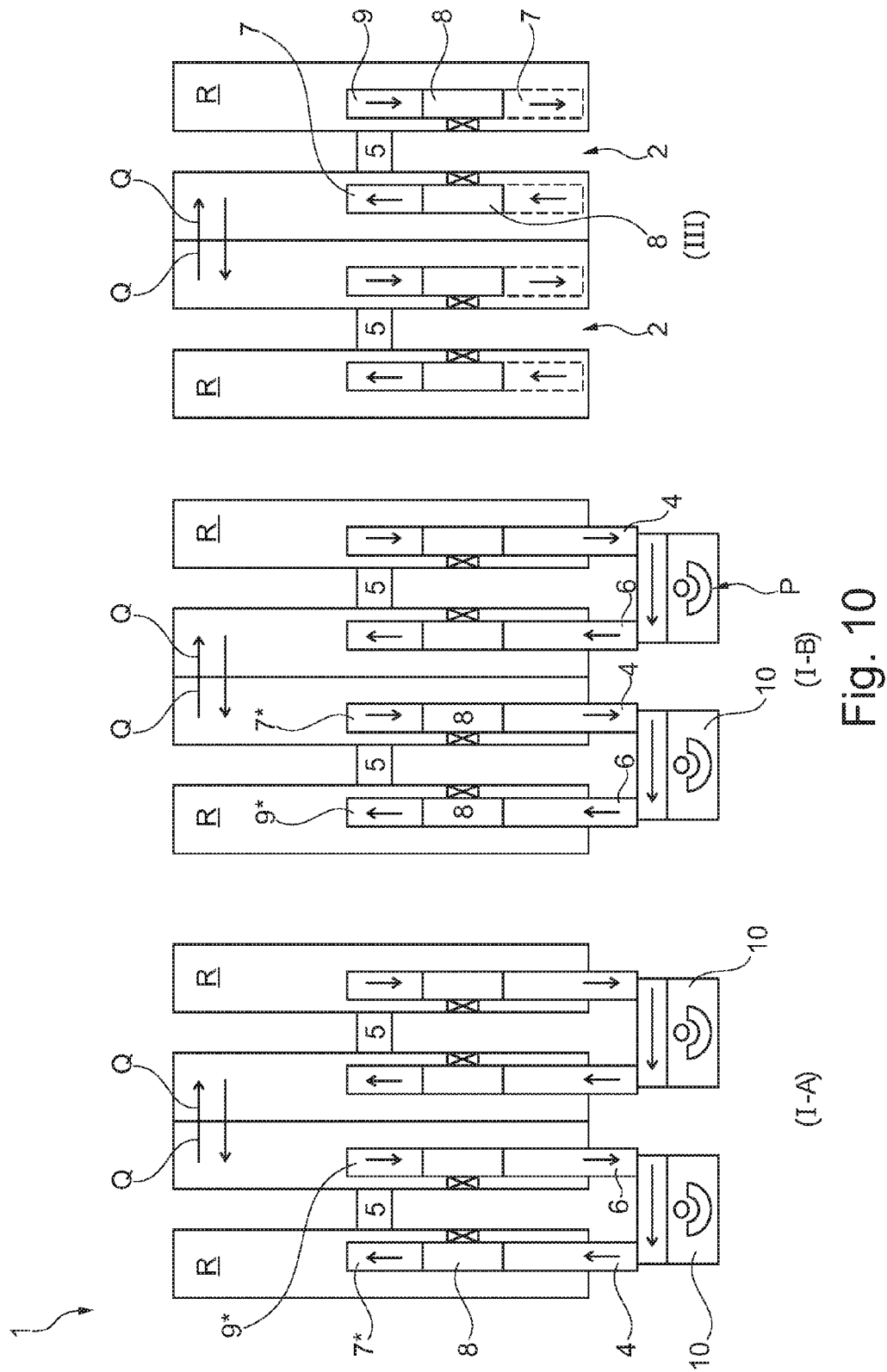
FIG. 10 shows a schematic plan view of an even further example embodiment of a storage facility, wherein the picking stations are connected to two lifts within an aisle via two levels for consolidated or mixed sourcing and dispatch.

As illustrated in FIG. 10, each rack R of an aisle 2 has a lift 8 and there are two conveyor levels as in FIG. 6. However, this embodiment may have one inbound conveyor 4 and one outbound conveyor 6 on each level I-A, I-B but with altered directions and both levels feed/dispatch dedicated picking stations 10 belonging to each level.

In other words, the lifts 8 can either stop at different levels (A or B) to serve the corresponding conveyors 4 or 6.

Non-picking levels III are the same as in FIG. 4, with the second pair of buffer conveyors 7, 9 being optional in a rack R and their direction alternating by each level or each few levels if such a second pair of buffer conveyors is not used.

The above embodiments may be combined with each other in many ways within the scope of the invention.

The corresponding structures, materials, acts, and equivalents of all means plus function elements in any claims below are intended to include any structure, material, or acts for performing the function in combination with other claim elements as specifically claimed. Those skilled in the art will appreciate that many modifications to the exemplary embodiments are possible without departing from the scope of the present invention. In addition, it is possible to use some of the features of the embodiments disclosed without the corresponding use of the other features. Accordingly, the foregoing description of the exemplary embodiments is provided for the purpose of illustrating the principles of the invention, and not in limitation thereof, since the scope of the present invention is defined solely by the appended claims.

The invention claimed is:
1. A method of order fulfilling, comprising:
  making order and/or product units available from a storage facility in a desired sequence at a selected picking station of a series of picking stations, wherein the storage facility comprises:
    a storage racking comprising a plurality of multilevel storage racks that store order and/or product units, and are disposed back-to-back in pairs with an aisle arranged therebetween;
    at least one automatic storage and retrieval device including a shuttle, the at least one automatic storage and retrieval device storing and retrieving order and/or product units from the storage racks;
    at least one lift used to transfer the order and/or product units to at least one storage-exit conveyor for retrieval of the order and/or product units from the storage racking; and
    at least one storage-entry conveyor for feeding the order and/or product units into the storage racking, and
  wherein the series of picking stations comprises at least one fully or semiautomatic picking station for picking products from product units received at the picking station and placing the picked products into order units received at the picking station for fulfilling one or more orders; and exchanging the order units and/or product units between a source storage rack to an adjacent destination storage rack of adjoining storage racks via cross conveyance locations, wherein the at least one lift is directly connected to the at least one picking station of the series of picking stations along a picking level by the storage-entry conveyor and the storage-exit conveyor.

2. The method according to claim 1, wherein the at least one lift is arranged in one of the pairs of racks of a selected aisle.

3. The method according to claim 2, wherein the at least one lift comprises of the series of lifts arranged in each of the storage racks of at least one aisle.

4. The method according to claim 1, further comprising: decoupling the shuttle from the at least one lift by an inbound-buffer-conveyor and/or an outbound-buffer-conveyor, wherein the buffer-conveyors are arranged within the storage racks.

5. The method according to claim 1, wherein the storage-entry conveyor and the storage-exit conveyor are arranged in the same level.

6. The method according to claim 1, wherein the storage-entry conveyor and the storage-exit conveyor are arranged in different levels.

7. The method according to claim 1, wherein the cross conveyance locations are arranged directly behind or next to the inbound-buffer-conveyor and/or outbound-buffer-conveyor within one of the storage racks.

8. The method according to claim 1, further comprising: displacing the order and/or product units within the cross conveyance locations with the shuttle.

9. The method according to claim 8, further comprising: placing the order and/or product units into the cross conveyance location in an adjacent destination rack with the shuttle of a source rack.

10. The method according to claim 1, wherein a storage rack entry and exit is formed with a conveyor loop comprising the at least one storage-entry conveyor, the at least one lift and the at least one storage-exit conveyor, wherein the at least one lift is fed by the storage-entry conveyor and feeds the storage-exit conveyor.

11. The method according to claim 1, wherein two or more lifts are connected to one or more picking stations of the series of picking stations.

12. The method according to claim 1, wherein only the at least one lift is connected to one or more picking stations of the series of picking stations.

13. The method according to claim 1, wherein two lifts are arranged in single aisle and are connected to one or more picking stations of the series of picking stations on a single level.

14. The method according to claim 1, wherein a storage-entry and/or exit conveyor level has buffer conveyors directly feeding or fed by the storage-entry and/or exit conveyors.

15. The method according to claim 1, wherein multiple picking stations of the series of picking stations are facing each other and a series of lifts are located therebetween.

16. The method according to claim 15, wherein two picking stations of the series of picking stations are connected to two lifts of the series of lifts on a single level.

17. A method for order fulfillment, comprising:

retrieving product units containing products for fulfillment of one or more orders from a storage facility, wherein the storage facility comprises:

a storage racking comprising a plurality of multilevel storage racks in which the product units and/or order units with products therein are stored, wherein the storage racks are disposed in back-to-back pairs with an aisle arranged therebetween;

a plurality of shuttles movable about the storage racking and comprising at least one shuttle movable about each aisle, wherein the product units and/or the order units are stored and selectively retrieved from the storage racking by the plurality of shuttles;

a plurality of lifts operable to transfer the product units and/or the order units to one or more storage-exit conveyors for retrieval of the order units and/or the product units from the storage racking; and one or more storage-entry conveyors configured for feeding the product units and/or the order units to the storage racks of the storage racking, wherein at least one lift of the plurality of lifts is directly linked to at least one picking station of the one or more picking stations by at least one storage-entry conveyor and at least one storage-exit conveyor;

placing one or more of the product units and/or one or more of the order units into a cross conveyance location in the adjacent destination rack with at least one shuttle of the plurality of shuttles corresponding to a source storage rack of the storage racking;

exchanging the one or more of the product units and/or the one or more of the order units between the source storage rack to an adjacent destination storage rack of the storage racking via the cross conveyance location, wherein the one or more of the product units and/or the one or more of the order units are displaced along the cross conveyance location with at least one shuttle of the plurality of shuttles; and receiving a set of product units of the product units obtained from the storage racking in a desired sequence at one or more fully or semiautomatic picking stations for selectively picking of products from the set of product units and placing the picked products into a set of order units of the order units received at the picking station for the fulfilment of the one or more orders.

* * * * *